Figure 1:
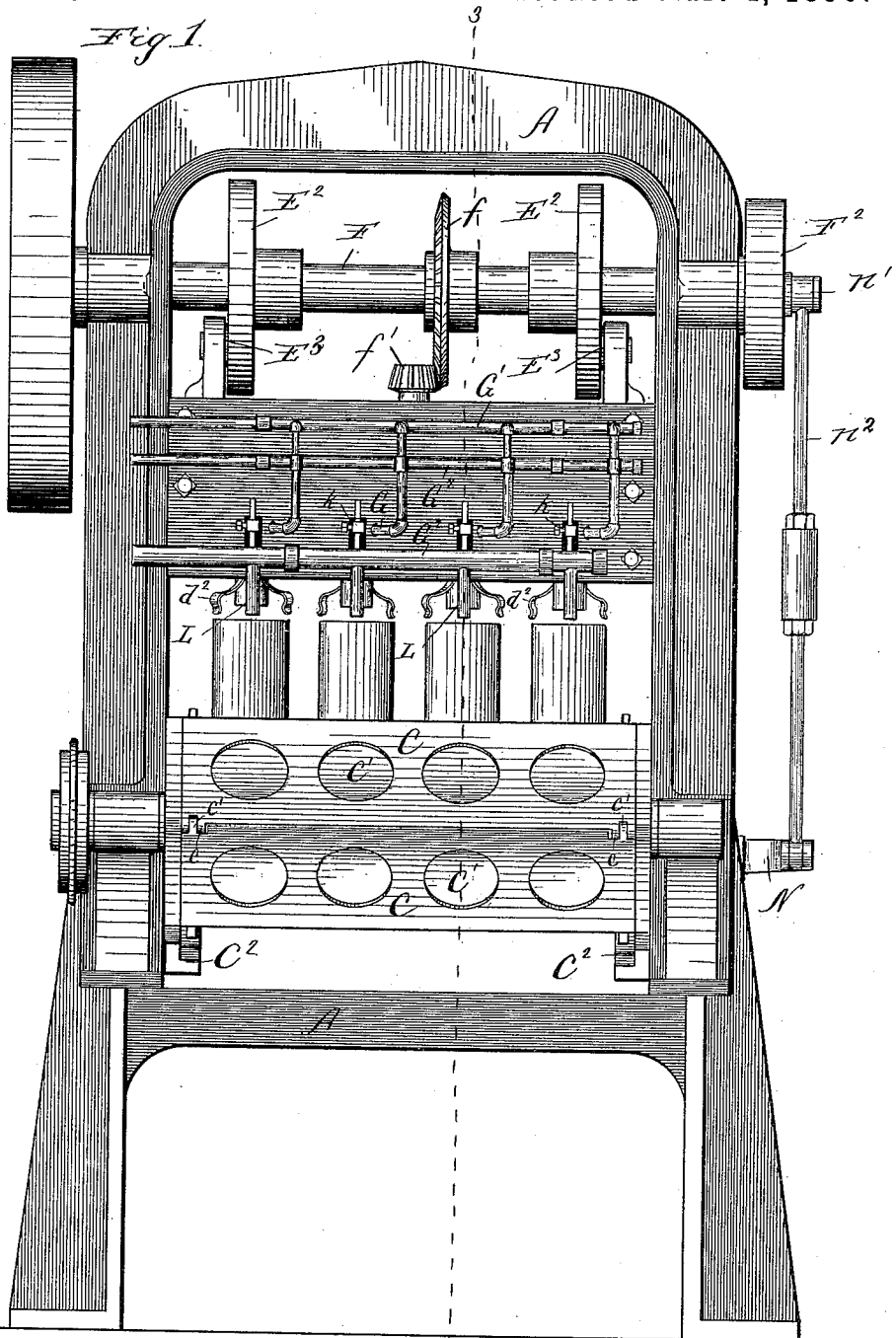

(No Model.) 3 Sheets—Sheet 2.

E. NORTON & J. G. HODGSON.
CAN CAP SOLDERING MACHINE.

No. 422,434. Patented Mar. 4, 1890.

Witnesses:
Lew. E. Curtis.
Mack A. Claflin.

Inventors
Edwin Norton
John G. Hodgson
By Munday, Evarts & Adcock
their Attorneys.

(No Model.) 3 Sheets—Sheet 3.
E. NORTON & J. G. HODGSON
CAN CAP SOLDERING MACHINE.
No. 422,434. Patented Mar. 4, 1890.
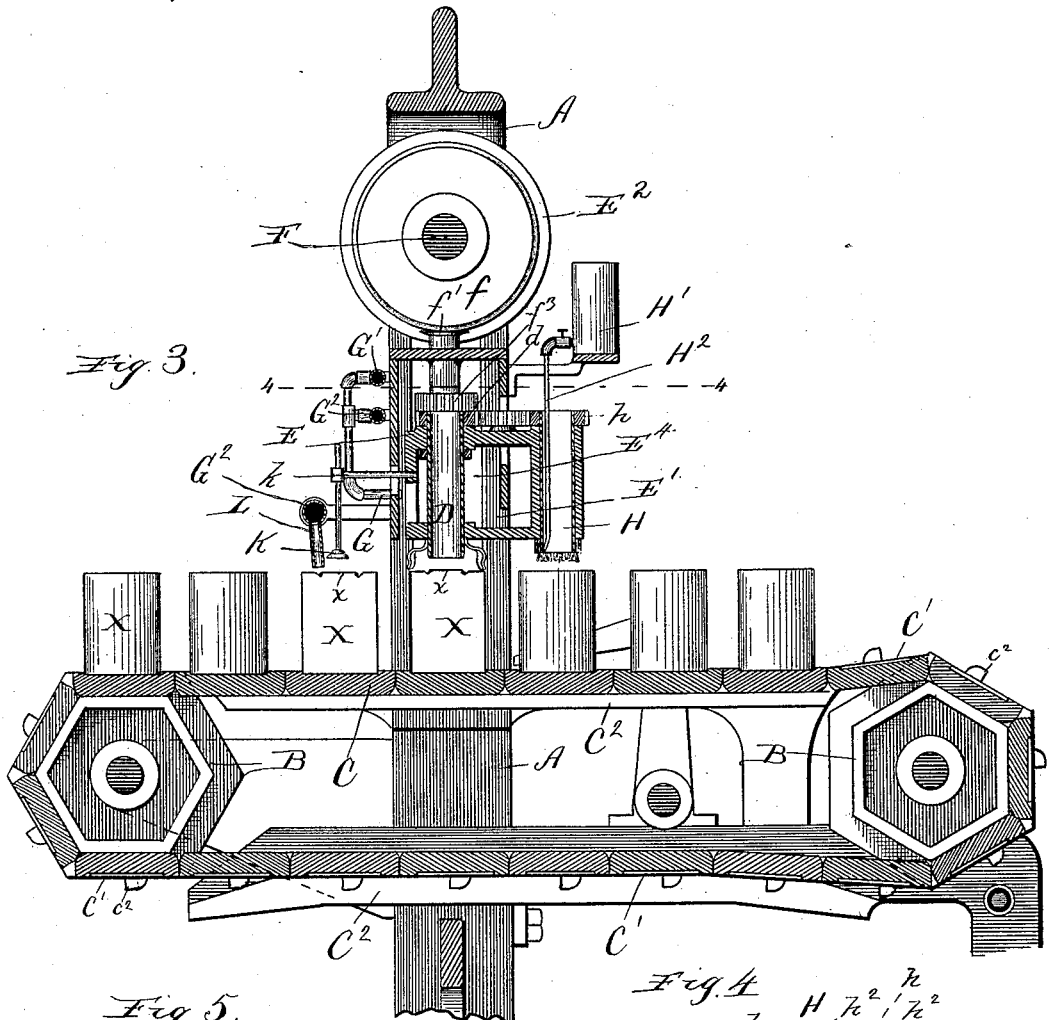
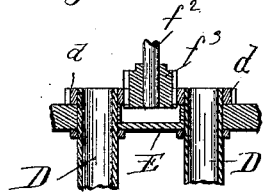
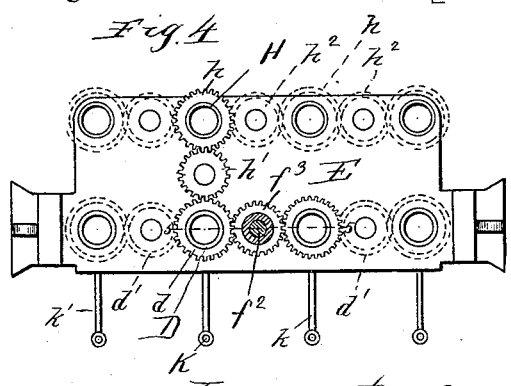
Witnesses:
Lew. C. Curtis.
Mark A. Claflin.
Inventors:
Edwin Norton
John G. Hodgson
By Munday, Evarts & Adcock
their Attorneys

UNITED STATES PATENT OFFICE.

EDWIN NORTON AND JOHN G. HODGSON, OF MAYWOOD, ILLINOIS, ASSIGNORS TO SAID EDWIN NORTON, OF SAME PLACE, AND OLIVER W. NORTON, OF CHICAGO, ILLINOIS.

CAN-CAP-SOLDERING MACHINE.

SPECIFICATION forming part of Letters Patent No. 422,434, dated March 4, 1890.

Application filed October 1, 1888. Serial No. 286,915. (No model.)

*To all whom it may concern:*

Be it known that we, EDWIN NORTON and JOHN G. HODGSON, citizens of the United States, residing in Maywood, in the county of Cook and State of Illinois, have invented a new and useful Improvement in Can-Cap-Soldering Machines, of which the following is a specification.

Our invention relates to machines for soldering the caps on filled cans.

In our present improvement the can-carrier is provided with a series of can-holders arranged transversely to its line of movement, by means of which a series of cans are simultaneously presented to or beneath a series of revoluble vertically-reciprocating hollow soldering-tools, by which all the cans of the series are simultaneously soldered. The can-carrier preferably consists of a link chain mounted on horizontal wheels or rollers, each link of the chain having a series of two or more, preferably four, can holders or sockets arranged transversely to the chain or parallel to the pulleys upon which the chain is carried. The carrier is given an intermittent movement, the can-holders stopping under the soldering-tools a sufficient interval for soldering. The can-holders preferably consist simply of cups or sockets to fit the diameter of the can cut in the hinged metal plates, forming the links of the chain-carrier. These sockets, preferably, like ordinary can-chucks, have smaller sockets within them to fit cans of different diameters. The vertically-reciprocating soldering tools or irons are each furnished with a can-holder clamp, preferably consisting of three spring-arms, to guide or hold the upper ends of the can during the soldering operation. The series of hollow soldering-tools are simultaneously moved up and down by a reciprocating cross-head, upon which they are all mounted. The soldering-tools are each furnished with a gear, by means of which they are all revolved from a common source of power. The soldering-tools are preferably heated by gas-jets. While one series of cans are thus being soldered the next succeeding series of cans are fluxed by a similar transverse series of vertically-reciprocating fluxing or aciding devices. The fluxing devices preferably consist of revolving hollow or annular brushes, the brush tubes or shafts being provided with gears, by which they are revolved similarly to the soldering-tools. The fluxing-brushes are supplied with acid or other suitable liquid flux from a tank or reservoir above through suitable pipes which extend down through the hollow brush-tubes. The fluxing-brushes are mounted upon and moved up and down by the cross-head which carries the soldering-tools. While the series of cans before mentioned are being acted upon by the series of soldering-tools the next preceding series of cans are cooled by a series of air-jets, the caps of the cans at this time being held firmly in place on the cans by a series of plungers carried by the cross-head before mentioned. As the link-chain carrier turns around its horizontal pulley or roller, the sealed or soldered cans are automatically delivered from the carrier upon a suitable chute provided to receive them.

Our invention consists in the novel devices and novel combinations of parts and devices herein shown and described, and more particularly pointed out in the claims.

Figure 2:
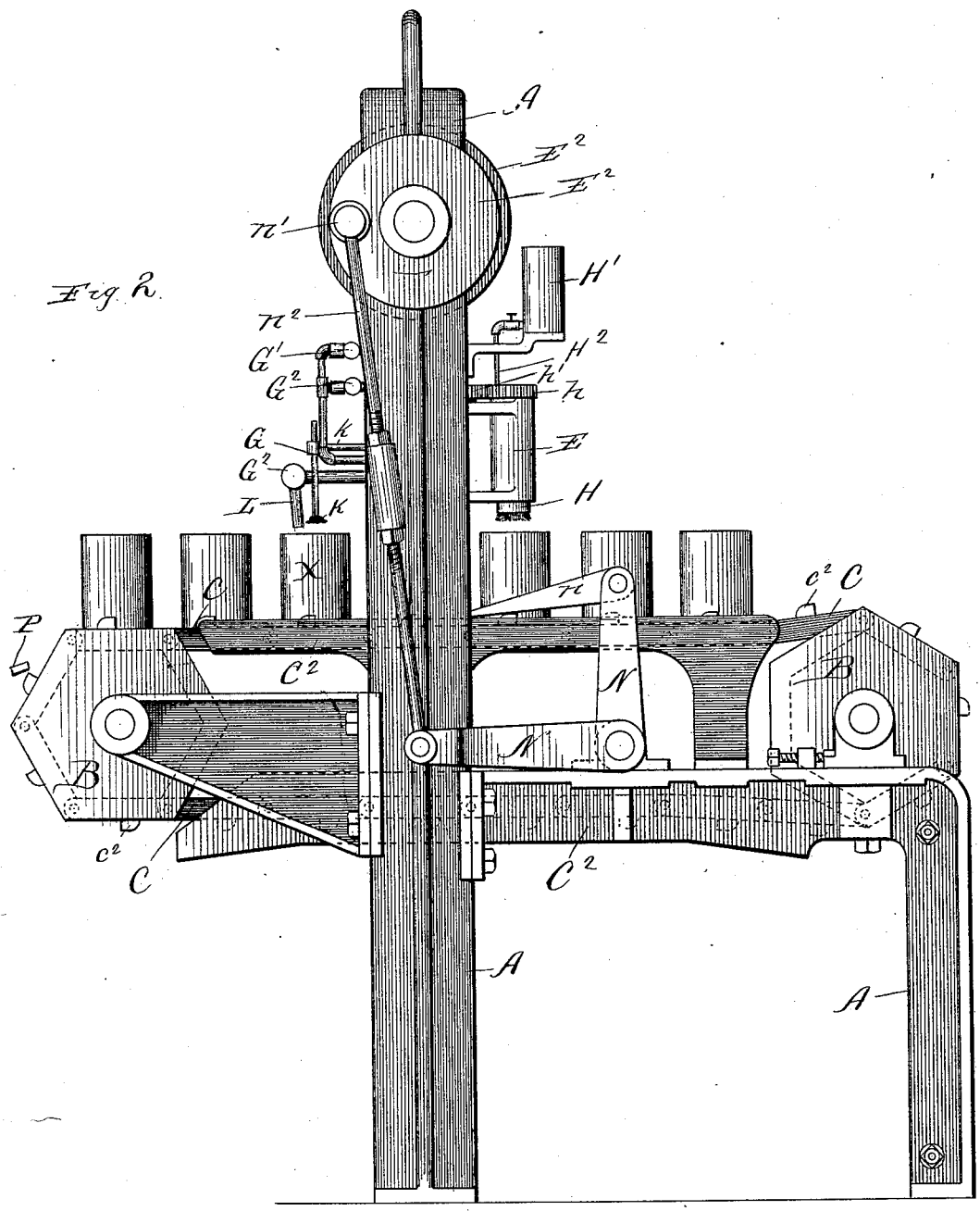

In the accompanying drawings, which form a part of this specification, and in which similar letters of reference indicate like parts, Figure 1 is a front elevation of a machine embodying our invention. Fig. 2 is a side elevation, and Fig. 3 is a longitudinal vertical section on line 3 3 of Fig. 1. Fig. 4 is a horizontal section on line 4 4 of Fig. 3, and Fig. 5 is a section on line 5 5 of Fig. 4.

In said drawings, A represents the frame of the machine; B B, the horizontal polygon wheels or rollers upon which the can-carrier chain C travels. The links of the carrier-chain each consist of plates having hinges $c$ $c'$ at their side edges. Each link of the chain is furnished with a series of can-holders C', extending transversely across the chain. These holders preferably consist simply of circular or cup-shaped recesses or sockets corresponding to the size of the can. Several of these sockets or recesses may be cut one within another, so that the same machine may be used upon cans of different diameters. The carrier C is supported upon guides or tracks $C^2$, extending between the pulleys B B.

A series of vertically-movable revoluble soldering tools or irons D are journaled in a cross-head E, which extends across the machine parallel to the series of can-holders C' in the carrier C. The cross-head E is reciprocated in vertical guides E' on the frame of the machine by grooved cams $E^2$ on the driving-shaft F, the cross-head being furnished with pins or friction-rollers $E^3$, that fit in said cams. The soldering-tools D are preferably tubular in form, corresponding in size to the can-caps $x$, which are to be soldered to the cans X. These soldering-irons are each provided with a gear $d$, by which they are turned or revolved. The soldering-tools are rotated from the driving-shaft F by means of a bevel-gear $f$ thereon, which meshes with a bevel-gear $f'$ on the vertical shaft $f^2$, the same being provided with a long gear $f^3$, that meshes with the gears $d$ on the two adjacent soldering-tools D. Intermediate gears $d'$ communicate motion to the two extreme soldering-tools. The gear $f^3$ is made long enough to permit of the vertical movement of the cross-head E without disengaging the gears $d$ from the gear $f^3$, the shaft of which is journaled on the frame of the machine.

The soldering-tools D are heated by gas-jets G, which project the flame against the tools. G' is the gas-supply pipe, and $G^2$ is an air-supply pipe for supplying air to the burners. The cross-head E is made hollow, so that the chamber $E^4$ inside the same may serve to confine the heat and flame around the soldering-tools D, which extend through said chamber.

Journaled on the cross-head E and vertically movable with it is a series of revoluble fluxing devices H, extending across the machine parallel to the series of soldering-tools D. The fluxing devices H preferably consist of hollow brushes, which are supplied with acid or other flux from a tank or tanks H' above by pipes $H^2$, which extend down inside the hollow-brush tubes. The hollow-brush tubes H are each provided at their upper ends with gears $h$, by which they are rotated. An intermediate gear $h'$ communicates motion from one of the gears $d$ to one of the gears $h$ and intermediate gears $h^2$ from such driven gear $h$ to the gears $h$ of the other brush-tubes.

A series of holding-plungers K, adjustably secured to arms $k$, extending from the cross-head E, serve to hold the caps $x$ firmly in place while the soldered seams of the series of cans just operated upon by the series of soldering-tools D are being cooled by the transverse series of cooling devices L. The cooling devices L, consisting, preferably, of air-jet pipes connected with the air-pipe $G^2$, blow jets of cold air upon the soldered cap-seam and quickly set the solder.

The link-chain carrier C is moved intermittently by means of a bent lever N, having a pivoted pawl $n$, which engages notches or projections $c$ on the links of the chain. This bent lever is operated by a crank or wrist pin $n'$ on the wheel $F^2$ and piston or connecting rod $n^2$.

The machine which we have herein shown in the drawings is specially designed for soldering caps which are hemmed with sheet-solder, as shown and described in the patent, No. 364,662, granted to said Edwin Norton, June 14, 1887. The solder may, however, be supplied to the seam in any other suitable way known to those skilled in the art.

In operation, at each step of the can-carrier a series of four cans, with their solder-hemmed caps in place thereon, are placed in the four can holders or sockets of each link at the right-hand end of the machine, and at the same time a preceding series of four cans are fluxed by the fluxing devices H, another series soldered by the tools D, and still another preceding series cooled by the cooling devices L, while the furthermost series are automatically discharged from the carrier C upon the chute P as the carrier turns around the left pulley or wheel B at the left-hand end of the machine.

The soldering-tools D are each furnished with holding fingers or devices $d^2$ to steady or hold the can during the soldering operation. The holding-clamp $d^2$ may preferably be attached directly to the soldering-tool, as shown in the drawings.

We claim—

1. The combination of an endless flexible carrier, having a series of can-holders arranged transversely to its line of movement, with horizontal wheels or rollers, upon which said carrier is mounted, and a like series of soldering or heating devices extending across the carrier, substantially as specified.

2. The combination of an intermittently-movable flexible can-carrier, having a series of can-holders extending transversely to its line of movement, with horizontal wheels or rollers, upon which said flexible carrier is mounted, and a series of soldering devices extending transversely to the carrier, substantially as specified.

3. The combination, with an endless chain carrier having a number of transverse series of can-holders extending each on the successive links of the chain transversely to its line of movement, of a series of revolving vertically-reciprocating soldering-tools arranged in a row transverse to the line of movement of said carrier, substantially as specified.

4. The combination, with an intermittently-moving endless link-chain carrier having transverse series of can-holders on the successive links of the chain, of a series of vertically-reciprocating revolving soldering-tools arranged in a row transverse to the line of movement of the carriers, and a series of vertically-reciprocating fluxing devices, substantially as specified.

5. The combination, with an intermittently-moving endless flexible carrier having transverse series of can-holders, of horizontal wheels or rollers, upon which said carrier is mounted, a transverse series of vertically-reciprocating soldering-tools, and a transverse series of cooling devices, substantially as specified.

6. In a soldering-machine, the combination, with an intermittently-moving endless flexible carrier having transverse series of can-holders, of horizontal wheels or rollers, upon which said carrier is mounted, and a transverse series of vertically-reciprocating holding-plungers for holding the caps or heads upon the cans, substantially as specified.

7. In a soldering-machine, the combination, with an intermittently-moving endless flexible carrier having transverse series of can-holders, of horizontal wheels or rollers, upon which said carrier is mounted, a transverse series of vertically-reciprocating holding-plungers for holding the caps or heads upon the cans, and a transverse series of cooling devices, substantially as specified.

8. The combination, with an intermittently-moving endless flexible can-carrier having transverse series of can-holders, of horizontal wheels or rollers, upon which said carrier is mounted, a transverse series of vertically-reciprocating fluxing devices, a transverse series of vertically-reciprocating soldering devices, a transverse series of vertically-reciprocating holding-plungers, and a transverse series of cooling devices, substantially as specified.

9. The combination, with an intermittently-moving endless flexible can-carrier having transverse series of can-holders, of horizontal wheels or rollers, upon which said carrier is mounted, a transverse series of vertically-reciprocating fluxing devices, a transverse series of vertically-reciprocating soldering devices, and a transverse series of vertically-reciprocating holding-plungers, substantially as specified.

10. The combination, with horizontal wheels or rollers B B, of intermittently-moving link-chain can-carrier C, having series of can-holders C', extending transversely to its line of movement, a vertically-reciprocating cross-head E, a series of hollow revolving soldering-tools D, mounted thereon, and a series of hollow revolving fluxing-brushes H, mounted on said cross-head E, substantially as specified.

11. The combination, with horizontal wheels or rollers B B, of intermittently-moving link-chain can-carrier C, having series of can-holders C', extending transversely to its line of movement, a vertically-reciprocating cross-head E, a series of hollow revolving soldering-tools D, mounted thereon, a series of hollow revolving fluxing-brushes H, mounted on said cross-head E, and a series of acid or flux supply pipes extending down through the hollow-brush tubes, substantially as specified.

12. The combination, with horizontal wheels or rollers B B, of intermittently-moving link-chain can-carrier C, having series of can-holders C', extending transversely to its line of movement, a vertically-reciprocating cross-head E, a series of hollow revolving soldering-tools D, mounted thereon, a series of hollow revolving fluxing-brushes H, mounted on said cross-head E, a series of acid or flux supply pipes extending down through the hollow-brush tubes, and a series of holding-plungers K, carried by said cross-head, substantially as specified.

13. The combination, with horizontal wheels or rollers B B, of intermittently-moving link-chain can-carrier C, having series of can-holders C', extending transversely to its line of movement, a vertically-reciprocating cross-head E, a series of hollow revolving soldering-tools D, mounted thereon, a series of hollow revolving fluxing-brushes H, mounted on said cross-head E, a series of acid or flux supply pipes extending down through the hollow-brush tubes, a series of holding-plungers K, carried by said cross-head, and air-jet-cooling pipes L, substantially as specified.

14. The combination, with a can-carrier, of a vertically-reciprocating revolving hollow fluxing-brush, substantially as specified.

15. The combination, with a can-carrier, of a vertically-reciprocating revolving hollow fluxing-brush and a flux-supply pipe extending down inside said hollow brush, substantially as specified.

16. The combination, with a can-carrier, of a vertically-reciprocating cross-head carrying a tubular revolving soldering-tool and a tubular revolving fluxing device, substantially as specified.

17. The combination, with a can-carrier, of a vertically-reciprocating cross-head carrying a tubular revolving soldering-tool, a tubular revolving fluxing device, and a holding-plunger, substantially as specified.

18. The combination, with a link-chain can-carrier C, having plate-links provided with two or more can-holder recesses extending transversely to the line of movement of the carrier, of horizontal pulleys or wheels, upon which said link-chain carrier is mounted, and means for intermittently moving the link-chain carrier, substantially as specified.

19. The combination, with an intermittently-moving can-carrier, of a soldering-tool and a can-cap-holding plunger mounted on the stationary frame of the machine separate from the carrier, and adapted and arranged to operate upon the can in the carrier preceding the one operated upon by the hollow soldering-tool, substantially as specified.

20. The combination, with an intermittently-moving can-carrier, of a vertically-movable revolving soldering-tool, a vertically-movable holding-plunger mounted on the stationary frame of the machine separate from the carrier one step in advance of said soldering-tool, and a cooling device adjacent to said holding-plunger and operating to cool the soldered seam while the can is clamped by said holding-plunger, substantially as specified.

EDWIN NORTON.
JOHN G. HODGSON.

Witnesses:
   EDMUND ADCOCK,
   H. M. MUNDAY.